United States Patent [19]

Swearingen

[11] 3,718,034
[45] Feb. 27, 1973

[54] HYDRAULIC CORROSION MONITORING COUPON INJECTOR

[76] Inventor: Dean E. Swearingen, 114 North Crownpoint, Ada, Okla. 74820

[22] Filed: Sept. 17, 1970

[21] Appl. No.: 72,972

[52] U.S. Cl. ..................................................73/86
[51] Int. Cl. .............................................G01n 17/00
[58] Field of Search .............73/86, 87, 432 R, 422 R

[56] References Cited

UNITED STATES PATENTS

| | | | |
|---|---|---|---|
| 3,007,340 | 11/1961 | Kraftson | 73/86 X |
| 2,783,644 | 3/1957 | Willis | 73/86 |
| 2,928,726 | 3/1960 | Oberly | 73/86 X |
| 3,174,332 | 3/1965 | Echtler et al. | 73/86 |

Primary Examiner—Richard C. Queisser
Assistant Examiner—Herbert Goldstein
Attorney—Clarence A. O'Brien and Harvey B. Jacobson

[57] ABSTRACT

A piston and cylinder assembly is mounted in valved communicating relation to the interior of a pipe line. The assembly includes a piston having a rod extending downwards toward a port in the pipe line. Upon proper actuation of hydraulic control means, the piston is forced downwardly until the piston rod is immersed in the fluid flowing through the pipe line. A metal plate is secured to the free end of the piston rod, the plate being subjected to the material flowing in the pipe line. After a certain interval, the hydraulic control means is actuated to cause retraction of the piston and the connected test plate. The plate is then removed and observed to determine the corrosive effect of the fluid on the pipe line.

3 Claims, 3 Drawing Figures

PATENTED FEB 27 1973 3,718,034
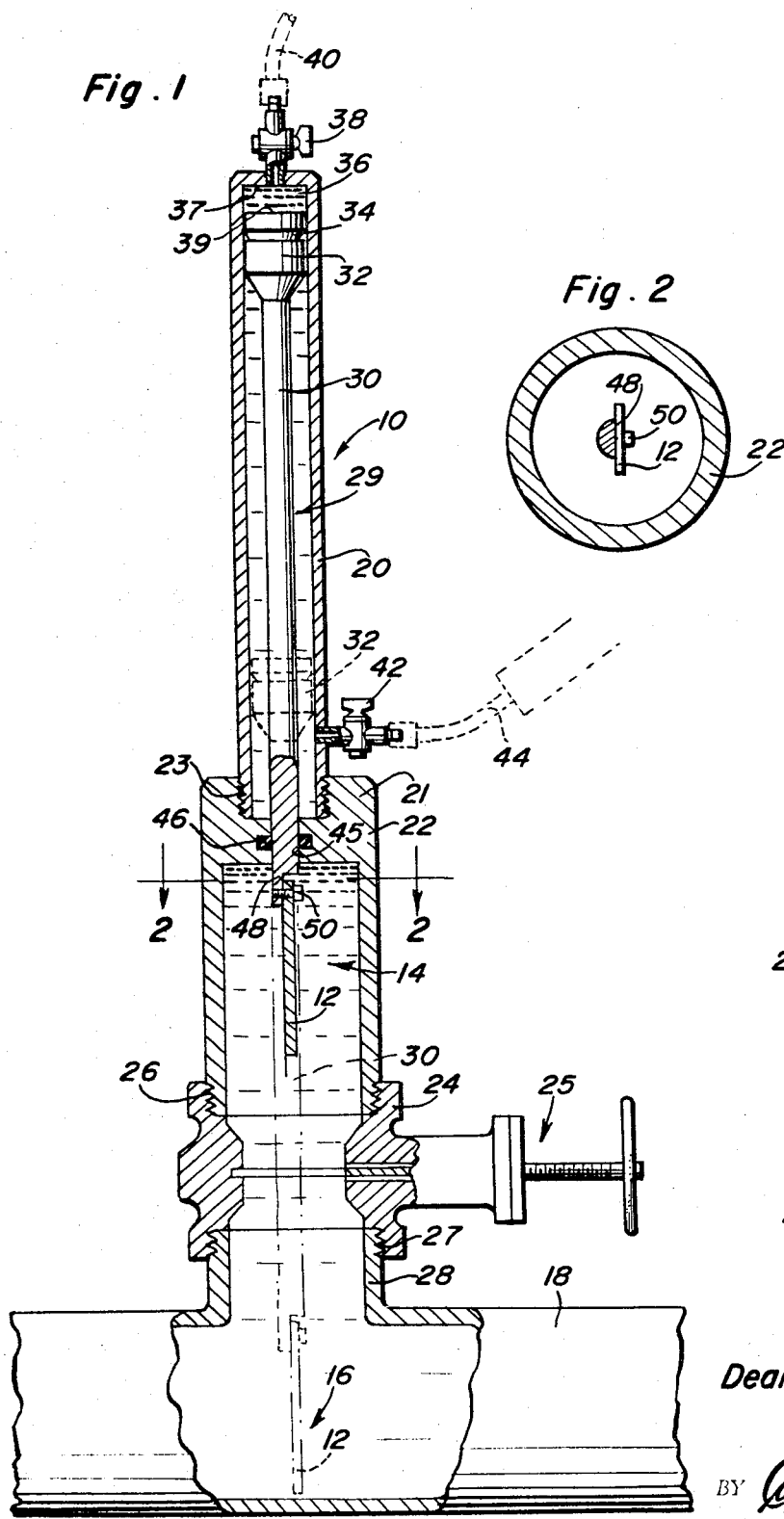
Fig. 1
Fig. 2
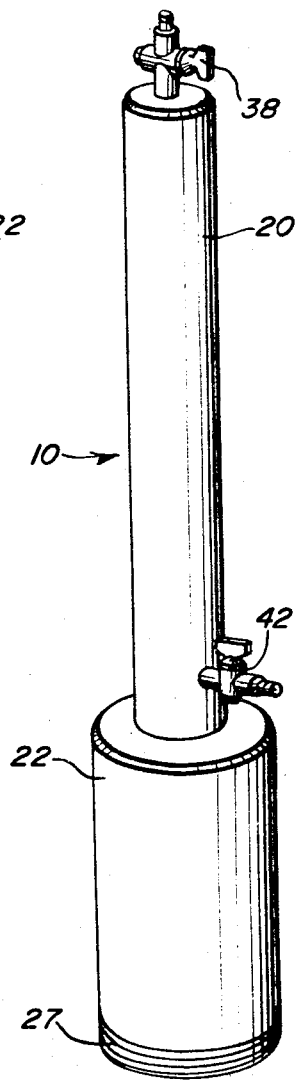
Fig. 3
Dean E. Swearingen
INVENTOR.
BY *Clarence A. O'Brien*
*and Harvey B. Jacobson*
Attorneys 3,718,034

HYDRAULIC CORROSION MONITORING COUPON INJECTOR

BACKGROUND OF THE INVENTION

The present invention relates to measurement of the corrosivity of fluids and relates more particularly to measurement of corrosivity in pipe line structures.

Various types of fluids, both in the gaseous and liquid state, have acidic pH characteristics or contain acidic compounds. Pipe line equipment such as conduits, valves, pumps and other assemblies that come in contact with these fluids become subjected to corrosion. The corrosion of the metal equipment is slow and is limited to the inner surface of the equipment. Thus, the effects of corrosion are not immediately detectable. In order to monitor corrosion, it has been customary to suspend metal test coupons or plates in the fluid for predetermined periods of time and determine the lose in weight, the decrease in linear dimensions and the depth of pitting. A large number of coupons are used to measure sludge and scale deposition.

A conventional method for displacing a test coupon in and out of a pipe line is by means of threaded members. When a threaded member is turned in a first direction, the rod and an attached coupon are lowered into the fluid flowing through the conduit. When the threaded member is turned oppositely, the coupon is retracted and made available for observation.

SUMMARY OF THE PRESENT INVENTION

The present invention is an improvement over presently available test coupon injectors. Rather than utilizing threaded members which themselves become subject to corrosion, the present invention includes displacement means that are operated from hydraulic sources. In essence, the invention includes a piston assembly with a centrally disposed piston member that is displaced into and out of a pipe line. A test coupon is attached to a piston rod and by actuating the hydraulic sources, the piston and attached test coupon can be either lowered into or retracted from the pipe line.

Not only is the present invention more reliable than similar devices of the prior art, but in addition, the device is more safe due to the fact that the operator can stand back from the injector during operation and he can control injection of the test coupon from a remote point.

It is to be stressed at the outset, that although the present invention is explained, in a preferred embodiment, as a test coupon injector, the mechanism employed in the invention has unlimited applications for extending and retracting a testing device into a communicating conduit or chamber. As an example, rather than employing a test coupon, a transducer could be substituted, the transducer being capable of transmitting data relative to the material flowing in the conduit. Transmission could be achieved by radio communication or direct wire connections (not shown). In fact, the present invention has great utility wherever it is desirable to displace a member or device from one position to another under controlled conditions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a sectional view exposing the interior components of the present invention.

FIG. 2 is a transverse sectional view taken along a plane passing through section line 2—2 of FIG. 1.

FIG. 3 is a perspective view illustrating the exterior appearance of the present invention.

Referring to the figures and more particularly FIG. 1, reference numeral 10 generally indicates the housing or casing for the present invention. The casing encloses a piston that selectively lowers and raises a test sample in the form of a coupon or plate 12. In a withdrawn position, the coupon is received within a chamber disposed at the lower end of the housing 10. The withdrawn position is denoted by reference numeral 14. Under proper actuation, the coupon is lowered into a pipe line or conduit 18 whereupon the coupon is subjected to the effects of corrosion. The lowered or operative position of the coupon is denoted by reference numeral 16.

As indicated in FIG. 3, the housing includes an upper piston containing cylinder 20 that threadingly engages an adapter 22. More particularly, the lower end of cylinder 20 is threadingly engaged in a shoulder portion 21 (FIG. 1) at the upper end of the adapter 22. The threads on the lower end of the cylinder 20 are indicated by reference numeral 23.

In order to isolate the present invention from the pipe line 18 during periods when coupon 12 is withdrawn to position 14, a gate or main valve 25 is provided having a housing 24 that threadingly couples threads 26 at the lower end of adapter 22 and threads 27 at the upper end of conduit port 28. The main valve 25 may be of any conventional type, such as the type having a handwheel as illustrated. The primary requirement of valve 25 is that the valve member per se can be retracted from the central portion of adapter 22 in order to allow clear passage of coupon 12 downwardly past the main valve and into the pipe line 18.

FIG. 1 illustrates the disposition of coupon 12 in the withdrawn or raised position 14. The coupon is attached to a piston assembly generally indicated by reference numeral 29. The assembly includes a frusto-conical downwardly tapering piston element 32 that extends downwardly to a piston rod 30 that is concentrically disposed in cylinder 30. An O-ring 34 or other suitable sealing means is disposed in the piston 32. The O-ring isolates the upper flat head of piston 32 from the lower tapering portion of the piston. Thus, a pressure differential between the upper and lower ends of the piston can be achieved. In the illustrated withdrawn position, an upper chamber 36 exists between the upper interior end 37 of the cylinder and the confronting head 39 of piston 32. This chamber communicates with a valve 38 that controls hydraulic flow from source 40 (which can be a hand pump). A second similar valve 42 communicates with the lower end of cylinder 20. The exact disposition of valve 42 is controlled by the position of the tapered piston portion when the piston 32 assumes the lowered position as indicated in phantom. The valve 42 is coupled with a suitable source of hydraulic pressure 44, similar to 40. In order to maintain rod 30 in an axially stable position, a bore 45 through which rod 30 passes is axially formed through the shoulder portion 21 of adapter 22. An O-ring 46 is received within shoulder 21 and seals rod 30 and the wall of bore 45 so that the corrosive fluid that exists within the hollow chamber in adapter 22 is restricted from entering the piston cylinder 20. In practice, the piston cylinder 20 is filled with grease or hydraulic fluid. As will be appreciated, this setup minimizes the exposure of the piston assembly components to the corrosive fluid flowing in the pipe line 18.

FIG. 2 illustrates the attachment of test coupon 12 to the lower end of piston rod 30. The lower rod end is cut away to form a flat surface 48 abutting the coupon 12, the coupon being secured by a suitable fastener 50.

In operation of the device, when the test coupon 12 is to be lowered into the pipe line 18, the main valve 25 is open. Then, valve 38 is opened to produce a positive pressure in the chamber 36 above piston 32. This pressure acts to force the piston 32 downwardly. At the same time, valve 42 is opened and operated in a bleed-off mode. Thus, a pressure differential occurs across the piston 32 such as to force the piston downwardly, from the withdrawn position 14 to the extended position 16 (shown in phantom). In this position, the coupon 12 becomes fully subjected to the flow of fluid within conduit 18.

After a predetermined time, it is desirable to withdraw coupon 12 so that an examination thereof can be made for determining the effect of corrosion by the fluid in the pipe line 18. To achieve this, valve 38 is opened and operated as a bleed-off valve. With valve 42 closed, there should be sufficient pressure differential across the piston 32 so as to force the piston 32 and its attached rod 30 upwardly. However, if additional pressure is required, this can be applied by opening valve 42 and applying a positive pressure. This pressure will actually be applied to the lower tapered portion of piston 32 when the piston 32 assumes its lowered position indicated in phantom. When the piston 32 rises to the upper position 29, the coupon 12 will be received in the chamber of adapter 22. Then, the gate or main valve 25 can be closed so as to isolate the piston assembly from the pipe line 18. The adapter 22 can then be unscrewed from valve housing 24 whereupon the test coupon 12 can be disconnected from rod 30 in order to allow observation of the coupon. Normally, a new coupon will be fastened to the rod for future use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for selectively maneuvering a testing device into and out of a conduit, comprising, in combination:
   a. an injector including a hollowed cylinder;
   b. a piston slidably positioned in the cylinder;
   c. means for securing a testing device to the piston;
   d. fluid means connected to the cylinder for positively maneuvering the testing device in and out of a conduit arranged passing the injector by causing selective displacement of said piston, said fluid means being independent of a flow in the conduit;
   e. a hollowed adapter interposed between the injector and the conduit to provide a chamber into which the testing device may be retracted, said adapter enclosing an end of said cylinder and provided with means for sealingly and slidably engaging the securing means for forming means for isolating the fluid means from said chamber; and
   f. a valve interposed between the adapter and the conduit for selectively closing off the conduit from the injector.

2. The structure of claim 1 wherein the fluid means comprises first and second controlled fluid sources, the first source communicating with a free end of the piston means, the second source communicating with an opposite side of the piston means, and sealing means attached to the piston means to isolate the first and second ends whereby the sources are coordinated to generate forces across the piston means in accordance with a desired direction of testing device movement.

3. The structure of claim 1 wherein the fluid means comprises first and second valve controlled hydraulic pumps, the first valve communicating with a free end of the piston; the second valve communicating with an opposite side of the piston, and sealing means attached to the piston to isolate the first and second ends of the piston, whereby the valves are coordinated to generate a pressure differential across the piston in accordance with a desired displacement of the coupon relative to the pipe line.

* * * * *